United States Patent [19]

Gharadjedaghi et al.

[11] 4,232,946
[45] Nov. 11, 1980

[54] LIQUID CRYSTAL ALIGNMENT LAYERS

[75] Inventors: Fereydoun Gharadjedaghi; Bernard Le Fur, both of Neuchâtel, Switzerland

[73] Assignee: Ebauches S.A., Canton of Neuchâtel, Switzerland

[21] Appl. No.: 970,981

[22] Filed: Dec. 19, 1978

[30] Foreign Application Priority Data

Dec. 28, 1977 [CH] Switzerland .................. 16115/77

[51] Int. Cl.² .............................................. G02F 1/13
[52] U.S. Cl. ................................... 350/320; 350/341
[58] Field of Search ................... 350/341, 320; 428/1

[56] References Cited

U.S. PATENT DOCUMENTS 3,967,883  7/1976  Meyerhofer et al. ............... 350/341

*Primary Examiner*—Edward S. Bauer
*Attorney, Agent, or Firm*—Silverman, Cass & Singer, Ltd.

[57] ABSTRACT

Two alignment films are deposited on a liquid crystal substrate. Each film is deposited at an angle of about 5° with respect to the substrate surface. The projection on the substrate of one deposition beam forms an angle of 180° with the projecton on the surface of the other deposition beam. The resultant liquid crystal cell has a sharp threshold with good contrast, particularly for multiplexing applications.

10 Claims, 3 Drawing Figures

LIQUID CRYSTAL ALIGNMENT LAYERS

The present invention relates to a method for manufacturing a passive electro-optic display cell having a helical nematic liquid crystal comprising two plates between which is disposed the said crystal, according to which one deposits on the inner face of each of the said plates an alignment film by evaporation under vacuum under an incidence ensuring an alignment of the molecules of the liquid crystal which thus orientate themselves along a direction determined by the process of evaporation.

It is to be noted that an alignment film is a thin layer of a material able to orientate the molecules of a liquid crystal when the latter is placed on the said layer. By way of example, such a film can be made of silicon oxide, $SiO_x$ ($1 < x < 2$), magnesium fluoride, $MgF_2$, platinum, chromium, etc. (cf. U.S. Pat. Nos. 3,834,792 and 3,853,391).

The invention also relates to an electro-optic passive display cell obtained by carrying out this method.

It is known that the substrate of the electro-optic passive display cells having nematic liquid crystals must be treated so that an alignment of the molecules of the said crystal be realized. Several techniques permitting to realize such an alignment are usual.

The first of these techniques which has been used consists in rubbing along a given direction, by means of a cotton waste, the surface of the substrate which will come into contact with the liquid crystal; the molecules of the liquid crystal which are in the vicinity of the substrate are aligned along the direction of the rubbing after the filling of the cell has been effected, and form an angle of 2° to 3° with respect to the surface of the substrate.

This technique, by rubbing, shows the drawback not to be easily usable for the cells the frame of which is made by means of sintered glass, the aligning properties of the surface thus treated tending to disappear during the heating of the cell in view of the fusion of the sintered glass. Moreover, the anchoring is relatively weak and an ageing occurs such that the duration of life of the cell can be decreased.

Another technique of orientation or of alignment of the molecules of the liquid crystal consists in depositing on a substrate an alignment film, for instance a layer of silicon oxide ($SiO_x$), under an incidence of the order of 30° with respect to the said substrate, the molecules of the liquid crystal which are in the vicinity of the latter then aligning themselves perpendicularly to the direction of the incidence and being generally parallel to the substrate.

In this case, one ascertains that domains (this term being used in the sense it has in crystallography) are formed during the application, to the cell, of a field higher than a threshold value. These domains are due to the fact that, the molecules being initially parallel to the base plate, their rocking can be effected in two opposite directions. Under these conditions, zones appear which present different optical behaviours, degrading the aesthetic appearance of the cell. There remains however that, for some applications, such as the multiplexing for instance, the presence of a threshold is desired, which would then conduce to adopt the solution of the deposition of $SiO_x$ under an incidence of 30°, the aesthetic appearance of which is unfortunately not satisfying.

One can also deposit the layer of silicon oxide under an incidence of the order of 5°. The projection on the substrate of the direction of alignment of the molecules which are in the vicinity of the latter then coincides with the projection of the direction of incidence of the $SiO_x$, these molecules, then making an angle of 15° to 30° with respect to the substrate.

In this case, the contrast of the display in function of the tension applied to the cell varies progressively from a zero tension, as indicates the curve I of FIG. 3 of the drawing, which is a drawback for some applications such as the multiplexing where, unavoidably, the electrodes of the segments which must not be displayed are nevertheless subjected to a residual tension during the activation of the segments which have to be displayed.

The purpose of the present invention is to remove these several drawbacks and, especially, to supply a cell in which the contrast of the display in function of the tension presents a threshold owing to which the segments which must not be displayed do not present an undesired effect of contrast when a residual tension due to the multiplexing is applied thereto. This purpose can be reached owing to the ascertainment of the fact that the curve of contrast in function of the tension changes its aspect according to the anchoring angle of the molecules of the liquid crystal on the plates of the cell and to the ascertainment of the fact that, for an average angle lower than 5°, this threshold is sufficiently marked (cf. curve II of FIG. 3 of the drawing).

The method according to the invention is characterized by the fact that one realizes the alignment film while applying, on at least one of the said plates, two layers of an alignment material under an incidence of about 5°, the projection, on the plate, of the vector of application of one of the said layers forming an angle of 180° with the projection, on the plate, of the vector of application of the other layer, the whole in such a way that the molecules of the liquid crystal are then anchored on the said plate under an angle, smaller than 10°, such that the average anchoring angle on the two plates be smaller than 5°.

One understands by average anchoring angle on the two plates the arithmetical mean of the anchoring angles of the liquid crystal on the two plates of the cell.

The drawing shows, by way of example, one embodiment of the invention.

FIGS. 1 and 2 represent one of the glass plates of the cell, designated by 1, and which is provided with a conductive track 2 constituting an electrode.

Figure 1:
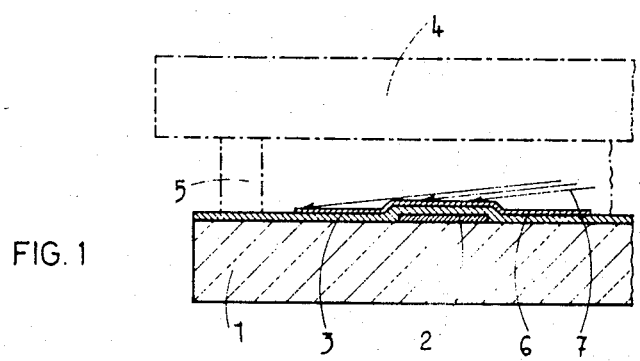
FIGS. 1 and 2 are sectional views of a part of an electro-optic passive display cell in two different stages of its manufacturing.

One applies on the plate 1, by evaporation under vacuum, a layer 3 of silicon dioxide ($SiO_2$), having a thickness of 2000 Å for instance, insulating the electrode 2 from the liquid crystal which will be placed later between the plate 1 and the second plate of the cell, represented in dot and dash lines in the drawing, designated by 4. A frame 5, also represented in dot and dash lines, maintains the two plates 1 and 4 at a distance from each other while ensuring their tight assembling permitting to imprison therebetween the liquid crystal.

One then applies on the layer 3 of $SiO_2$, by evaporation under a vacuum of $2 \cdot 10^{-6}$ Torr, for instance, a layer 6 of silicon oxide (SiO$_x$), having a thickness of 50 Å, under a so-called grazing incidence, of 5°, indicated by the arrows 7 of the drawing, by means of a unique source of application.

Figure 2:
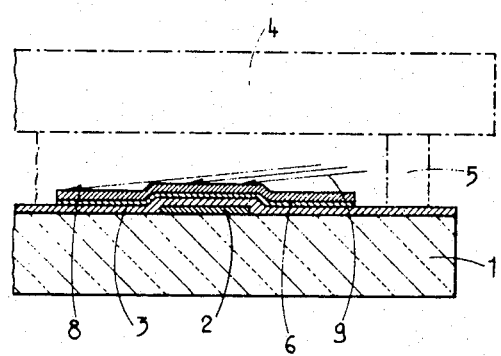

One then rotates the plate 1 on itself by 180°, the source of application of the material of alignment remaining stationary, thus bringing the plate into the position represented in FIG. 2. One then applies on the layer of silicon oxide 6 a second layer, designated by 8, of the said oxide, also by evaporation under vacuum, under an incidence of 5°, indicated by the arrows 9 of FIG. 2, having a thickness of 100 Å. Thus, the projection, onto the plate 1, of the vector of application of the layer 6 makes an angle of 180° with the projection, on the said plate, of the vector of application of the layer 8.

The experience shows that the alignment film realized by the two layers of silicon oxide 6 and 8, when these layers are deposited in the hereabove indicated way, has for effect that the molecules of the helical nematic liquid crystal are anchored on the plate 1 under an angle which, practically, will be lower than 5°, in general of 2 to 3°.

The important is that the anchoring angle of the molecules of the liquid crystal on the plate which has been treated be smaller than 10° so that the average anchoring angle on the two plates is smaller than 5°. As a fact, if the two plates are treated as indicated hereabove, it is sufficient that, on each of them, the anchoring angle be smaller than 5°, in order that the average anchoring angle on the two plates, that is to say the arithmetical mean of the anchoring angles on the two plates is also smaller than 5°. However, if the second plate, in the example represented, plate 4, is coated with only one alignment layer ensuring thereon a zero anchoring angle, it will be sufficient the anchoring angle on the plate 1 be smaller than 10° in order that the average anchoring angle on the two plates be smaller than 5°.

Figure 3:
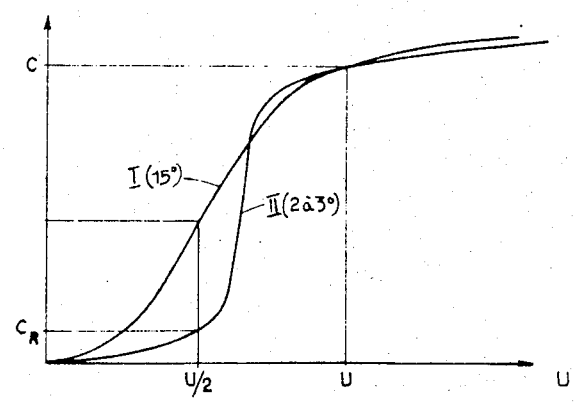
FIG. 3 is a diagram of the contrast of the segments of the cell in function of the tension applied to its electrodes, for two different anchoring angles of the molecules of its liquid crystal.

Such a device permits to realize a cell the contrast of which in function of the tension varies according to the curve II of FIG. 3. In the case represented, where the effective activation tension U is equal to about the double of the effective residual tension U/2, one ascertains that the contrast $C_R$ of the segments subjected to the residual tension is sufficiently weak so as not to be perceptible by the eye.

Moreover, the fact that the two applications of silicon oxide are made under the same incidence permits to use a same support for both operations. At last, the low value of this incidence has moreover the advantage that the installation is much less encumbering than it would be if the application of the silicon oxide would be effected, for instance, under an incidence of 30°, which can play an important role for the working in large series where the plates to be treated are disposed, in a great number, one above the others, maintained at a distance one from each other by means of suitable supports.

It is to be noted that one could, instead of rotating the plate of 180° on itself, between the two successive applications of the alignment material, with respect to the source, stationary, of application of this material, move the source with respect to the plate, maintained stationary, so that the projection on the plate of the vector of application of the first layer forms steadily an angle of 180° with the projection, on the plate, of the vector of application of the second layer.

One could also use two sources of application of the alignment material situated opposite to each other, and which would be caused to operate successively, or even simultaneously, for the realization, respectively, of each of the two layers.

What we claim is:

1. Method of manufacturing an electro-optic passive display cell having a helical nematic liquid crystal comprising two plates between which is disposed the said crystal, according to which one deposits on the inner face of each of the said plates an alignment film by evaporation under vacuum under an incidence ensuring an alignment of the molecules of the liquid crystal which thus orientate themselves along a direction determined by the process of evaporation, characterized by the fact that one realizes the said film by applying, on at least one of the said plates, two layers of an alignment material under an incidence of about 5°, the projection, on the plate, of the vector of application of one of the said layers forming an angle of 180° with the projection, on the plate, of the vector of application of the other layer, the whole in such a way that the molecules of the liquid crystal are then anchored on the said plate under an angle, smaller than 10°, such that the average anchoring angle on the two plates be smaller than 5°.

2. Method as claimed in claim 1, characterized by the fact that one applies successively the two layers of alignment material.

3. Method as claimed in claim 2, characterized by the fact that one gives to the first layer of the alignment film a thickness of about 50 Å and to the second one a thickness of about 100 Å.

4. Method as claimed in claim 2, characterized by the fact that between the applications on the plate of the two layers forming the alignment film one causes the plate to rotate on itself by an angle of 180°.

5. Method as claimed in claim 2, characterized by the fact that one uses a unique source of application of the two layers forming the alignment film and moves this source with respect to the plate, between the two operations of application of the said layers, in such a way that the projections on the plate of the two vectors of application form between themselves an angle of 180°.

6. Method as claimed in claim 1, characterized by the fact that one deposits simultaneously the two layers of alignment material.

7. Method as claimed in claim 2 or 6, characterized by the fact that one uses two sources of application of the two layers forming the alignment film, which are opposite to each other, and causes said sources to operate in such a way as to realize one of the said layers by means of one of the said sources and the other one by means of the other source.

8. Method as claimed in claims 7, characterized by the fact that one causes the said two sources of application of the two layers forming the alignment film to operate successively.

9. Method as claimed in claims 7, characterized by the fact that one causes the said two sources of application of the two layers forming the alignment film to operate simultaneously.

10. Passive electro-optic display cell obtained by carrying out the method as claimed in claim 1.

* * * * *